(12) United States Patent
Ekdunge et al.

(10) Patent No.: US 10,593,976 B2
(45) Date of Patent: *Mar. 17, 2020

(54) CATALYTIC BURNER ARRANGEMENT

(71) Applicant: POWERCELL SWEDEN AB, Göteborg (SE)

(72) Inventors: Per Ekdunge, Västra Frölunda (SE); Federico Ghirelli, Göteborg (SE); Ida Toftefors, Göteborg (SE)

(73) Assignee: POWERCELL SWEDEN AB, Göteborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/528,756

(22) PCT Filed: Dec. 2, 2015

(86) PCT No.: PCT/SE2015/051304
§ 371 (c)(1),
(2) Date: May 22, 2017

(87) PCT Pub. No.: WO2016/089297
PCT Pub. Date: Jun. 9, 2016

(65) Prior Publication Data
US 2017/0365869 A1    Dec. 21, 2017

(30) Foreign Application Priority Data

Dec. 4, 2014    (SE) ........................................ 1451477

(51) Int. Cl.
*H01M 8/0662*    (2016.01)
*C01B 3/34*    (2006.01)
(Continued)

(52) U.S. Cl.
CPC ............. *H01M 8/0662* (2013.01); *C01B 3/34* (2013.01); *F23C 13/00* (2013.01); *F23D 14/02* (2013.01);
(Continued)

(58) Field of Classification Search
CPC ........................................... H01M 8/06–0687
See application file for complete search history.

(56) References Cited

U.S. PATENT DOCUMENTS 5,988,081 A    11/1999    Ashworth et al.
6,232,005 B1 *    5/2001    Pettit .................... B60L 11/1885
                                                                                    429/424

(Continued)

FOREIGN PATENT DOCUMENTS

JP    H11176460    7/1999
JP    H11176460 A    7/1999
(Continued)

OTHER PUBLICATIONS

Japanese Official Action (dated May 29, 2018) for corresponding Japanese App. 2017-529814.
(Continued)

*Primary Examiner* — Jonathan G Leong
*Assistant Examiner* — Jacob Buchanan
(74) *Attorney, Agent, or Firm* — WRB-IP LLP

(57) ABSTRACT

A catalytic burner arrangement including at least a catalytic burner unit with a housing having a reaction chamber in which a catalyst is arranged is provided wherein the catalyst is adapted to react a fuel, particularly a hydrogen containing fluid, with an oxidant, particularly air, for producing heat, the housing having a fluid inlet for supplying a fluid stream into the housing and a fluid outlet for exiting a fluid stream from the housing, and the catalytic burner arrangement further includes a mixing unit forming a mixing chamber in
(Continued)

which fuel and oxidant are mixed, wherein the mixing device includes a fuel inlet, an oxidant inlet and an fuel-oxidant-mixture outlet, and wherein the fluid inlet of the catalytic burner unit merges with the fuel-oxidant-outlet of the mixing unit for transferring the fuel-oxidant-mixture from the mixing chamber to the reaction chamber of the catalytic burner unit wherein the fuel inlet of the mixing chamber is arranged upstream of the oxidant inlet of the mixing unit.

10 Claims, 4 Drawing Sheets

(51) Int. Cl.
  *F23C 13/00* (2006.01)
  *F23D 14/02* (2006.01)
  *F23D 14/62* (2006.01)
  *H01M 8/0612* (2016.01)
(52) U.S. Cl.
  CPC .......... *F23D 14/62* (2013.01); *H01M 8/0618* (2013.01); *C01B 2203/0205* (2013.01); *C01B 2203/0233* (2013.01); *C01B 2203/06* (2013.01); *C01B 2203/066* (2013.01); *C01B 2203/0822* (2013.01); *C01B 2203/1235* (2013.01); *C01B 2203/1288* (2013.01); *F23C 2900/03002* (2013.01)

(56) References Cited

U.S. PATENT DOCUMENTS

| | | |
|---|---|---|
| 8,557,460 B2 | 10/2013 | Lucka et al. |
| 2002/0031458 A1 | 3/2002 | Hirata |
| 2003/0096204 A1 | 5/2003 | Hermann et al. |
| 2005/0208366 A1 | 9/2005 | Rohwer et al. |
| 2008/0244974 A1 | 10/2008 | Bartolini et al. |
| 2011/0171082 A1* | 7/2011 | Shiraishi ............... B01F 5/0057 422/198 |

FOREIGN PATENT DOCUMENTS

| | | |
|---|---|---|
| JP | 2006523603 | 10/2006 |
| JP | 201046634 | 3/2010 |
| WO | 01/18451 A1 | 3/2001 |

OTHER PUBLICATIONS

Japanese Official Action (dated Apr. 17, 2018) for corresponding Japanese App. 2017-529806.
International Search Report (dated May 9, 2016) for corresponding International App. PCT/SE2015/051304.
Korean Official Action (dated Aug. 30, 2018) for corresponding Korean App. 10-2017-7015152.
Indian Official Action (dated Jul. 18, 2019) for corresponding Indian App. 201727019327.

* cited by examiner

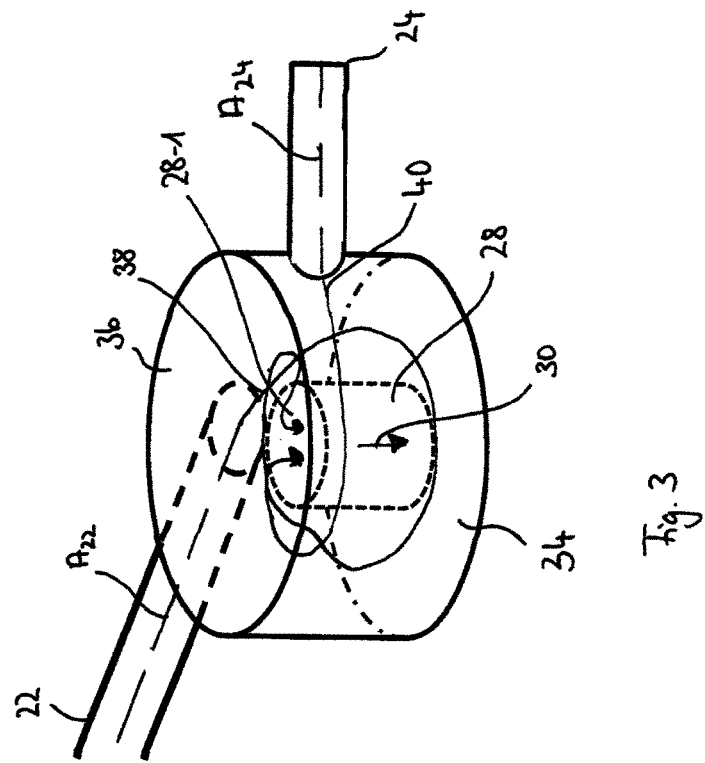
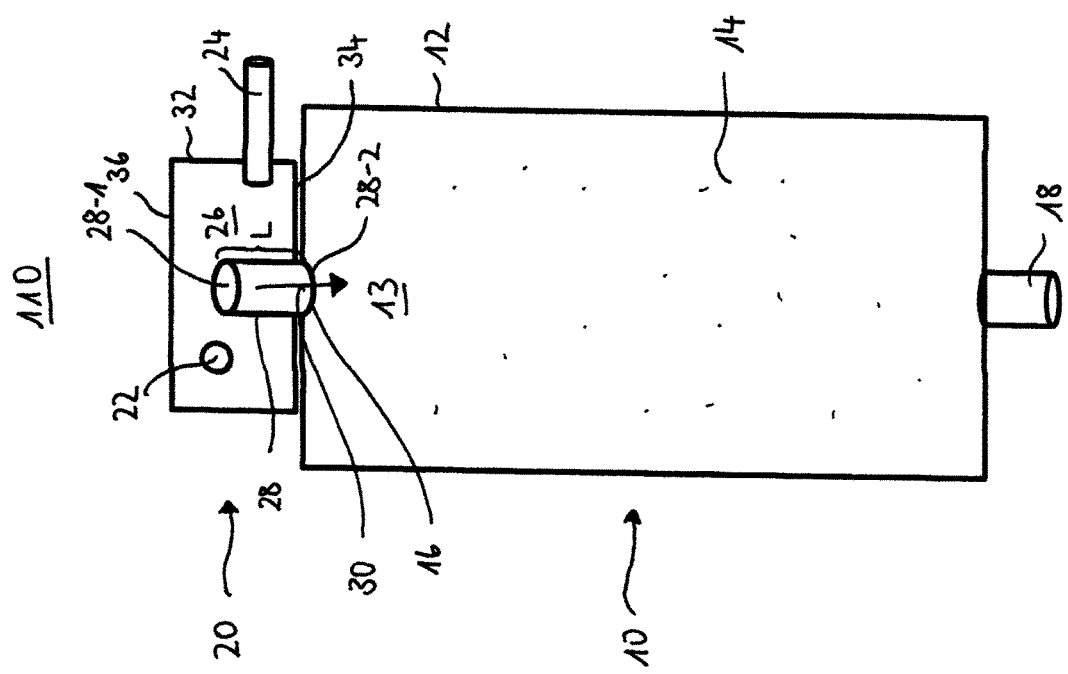

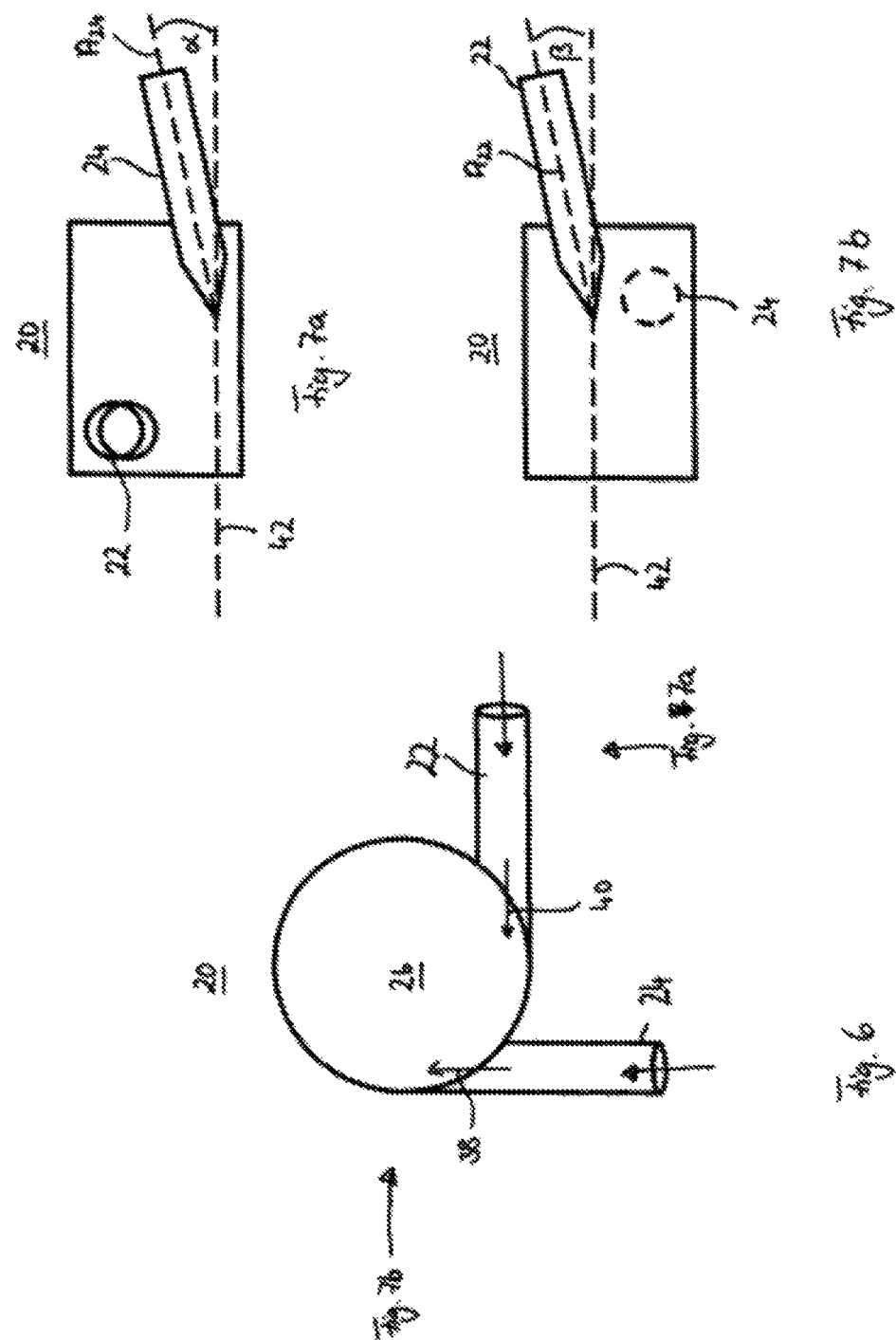

CATALYTIC BURNER ARRANGEMENT

BACKGROUND AND SUMMARY

The present invention relates to a catalytic burner arrangement, as well as to an auxiliary power assembly.

In auxiliary power units based on a fuel cell technology, energy is provided by a fuel cell stack. For the operation of the fuel cell usually hydrogen is used. In said APU systems hydrogen is usually produced by so called fuel reformers which generate a hydrogen rich gas from hydrocarbon fuels, like diesel, by means of a catalyst. In some preferred fuel reforming processes, as the autothermal fuel reforming process or the steam reforming process, steam is additionally used for the fuel reforming reaction. The heat required for the production of steam may be provided by use of a catalytic burner arranged downstream of the fuel cell or fuel cell stack, wherein air and excess hydrogen exiting the fuel cell stack are combusted over a catalyst to release energy, which can be used for the steam production.

The known catalytic burners have a housing defining a reaction chamber with aft inlet for fuel (hydrogen) and an inlet for oxidant (air), whereby fuel and oxidant are introduced into the reaction chamber. The housing further incorporates a catalyst, which is arranged downstream of the inlets, where hydrogen and air catalytically react with each other. The problem of the known catalytic burners is that air and hydrogen often react uncontrolled upstream of the catalyst as soon as being brought in contact with each other. In some cases air may even enter the fuel inlet, whereby such an uncontrolled combustion may also take place in the pipes. However, these uncontrolled combustions may damage the pipes as well as the burner itself. Additionally, often the mixing of air and fuel is inhomogeneous, which in turn results in the development of hotspots in the catalyst, which might damage the catalyst and produce unwanted emissions.

It is desirable to provide a catalytic burner, which hinders ignition of the hydrogen in the pipes and provides a homogenous mixture of air and fuel.

According to aspects of the present invention, a catalytic burner and an auxiliary power unit assembly are provided.

In the following a catalytic burner arrangement is provided which comprises at least a catalytic burner unit and a mixing unit. Thereby, the catalytic burner unit comprises a housing which defines a reaction chamber in which a catalyst is arranged. The catalyst is adapted to react a fuel, particularly a hydrogen containing fluid with an oxidant, particularly air, for producing heat. The housing further has a fluid inlet for supplying a fluid stream into the housing and a fluid outlet for exiting a fluid stream from the housing.

The mixing unit in turn forms a mixing chamber in which fuel and oxidant are mixed and comprises a fuel inlet and an oxidant inlet as well as a fuel-oxidant-mixture outlet. The fuel inlet of the catalytic burner unit merges with the fuel-oxidant-outlet of the mixing unit so that the fuel-oxidant-mixture from the mixing chamber may be transported to the reaction chamber of the catalytic burner unit.

In order to hinder the fuel and the oxidant reacting uncontrolled with each other and providing an improved mixing, said fuel-oxidant-outlet of the mixing chamber is pipe-shaped and extents into the mixing chamber of the mixing unit. By means of the pipe-shaped fuel-oxidant-outlet extending into the mixing chamber, fuel and oxidant are guided in a swirl around the fuel-oxidant-outlet and are forced to stream upwards and to change stream direction before the fuel/oxidant mixture may enter the fuel-oxidant-outlet.

It should be noted that "pipe-shaped" in the context of the present invention refers to an elongated hollow element, which may have a cylindrical or prismatic form. Said hollow element has at least two openings. At least one first opening allows an entrance of the fuel-oxidant mixture into the hollow element and at least one second opening allows an exit of the fuel-oxidant mixture from the hollow element and thereby from the mixing unit. Thereby, the at least one first opening is arranged inside the mixing chamber. It should be further explicitly noted that more than one opening as first opening and more than one opening as second opening may be provided.

According to an alternate solution, said fuel inlet of the mixing chamber is arranged upstream of said oxidant inlet. This staggered arrangement of the inlets prevents the oxidant from entering the fuel inlet and thereby prevents an uncontrolled ignition of the fuel. Even if it is preferred to provide in addition a pipe-shaped fuel-oxidant-outlet of the mixing chamber which extends into the mixing chamber of the mixing unit, the staggered arrangement alone also provides an improved mixing and prevents uncontrolled combustion.

According to a preferred embodiment, a length of the pipe-shaped fuel-oxidant-outlet extents over the oxidant inlet and/or the fuel inlet. Thereby, it may be preferred if the fuel-oxidant-outlet extends over both the oxidant inlet and the fuel inlet. In both embodiments, the swirl and the stream redirection may be maximized.

According to a further preferred embodiment, the fuel inlet of the mixing chamber is arranged upstream of said oxidant inlet. Thereby, the oxidant is reliably hindered from entering the fuel inlet and reacting uncontrolled.

According to a further preferred embodiment, the fuel inlet and oxidant inlet are arranged angled to a direction of a main fluid stream streaming through the fuel-oxidant-mixture outlet to the reaction chamber of the catalytic burner. Advantageously, the angled arrangement provides a homogenous mixture as the fluid needs to be redirected from the entrance direction to its exit direction, whereby a mixing of the fluids is performed.

For having a directed fluid stream of a fuel and oxidant, it is preferred if the fuel inlet and/or the oxidant inlet are designed as at least one pipe having a longitudinal axis, whereby the directed fluid streams are provided.

According to a further preferred embodiment, said mixing unit is prismaticly or cylindrical shaped having two basis plates and at least three side surfaces or a mantel side, wherein the fuel inlet and the oxidant inlet are arranged in the side surfaces or is the mantel side, and the fuel-oxidant-mixture outlet is arranged at one of the basis plates. Thereby, the geometric design of the mixing unit supports the mixing so that a very homogenous mixture may be provided.

According to a further preferred embodiment, at least one of the directed fluid streams are offset from a longitudinal axis of the mixing chamber, whereby at least one tangential fluid stream is provided. By means of the tangential fluid streams a homogenous mixture may be achieved.

According to a further preferred embodiment, the longitudinal axis of the fuel inlet and/or of the oxidant inlet are inclined to a cross sectional plane of the mixing chamber. By the inclined arrangement an uncontrolled ignition of oxidant and fuel and/or an unwanted entering of oxidant into the fuel pipe is avoided.

According to a further preferred embodiment, the oxidant inlet and the fuel inlet are arranged substantially rectangular to each other, whereby both the mixing is improved and an unwanted ignition is reliably avoided.

A further aspect of the present application relates to an auxiliary power assembly based on fuel cell technology which comprises at least a fuel processing assembly which is adapted to convert hydrocarbon fuels into a hydrogen rich gas for fuel cells by using at least hydrocarbon fuel and steam. Downstream of the processor assembly at least one fuel cell or fuel cell stack for providing auxiliary power is arranged. Downstream of the fuel cell a catalytic burner unit is provided which is adapted to burn unused hydrogen exiting from the fuel cell or the fuel cell stack by using an oxidant, such as air or oxygen, and a catalyst for reacting said oxidant and hydrogen to heat, wherein said heat in turn is used for the production of steam used in the fuel processing assembly. Thereby the catalytic burner is designed as described above.

Further embodiments and preferred arrangements are defined in the description, the figures and the attached claims.

BRIEF DESCRIPTION OF THE DRAWINGS

In the following the invention will be described by means embodiments shown in the figures. Thereby, the embodiments are exemplarily only and are not intended to limit the scope of the protection. The scope of protection is solely defined by the attached claims.

The figures show:

FIG. 2: a schematic view of a first preferred embodiment of the catalytic burner;

FIG. 3: a schematic detailed spatial view of the mixing unit shown in FIG. 2;

FIG. 6: a schematic top view of the mixing unit shown in FIG. 3 and FIG. 5

FIG. 7: schematic side views of the mixing unit of FIG. 6.

In the following same or similarly functioning elements are indicated with the same reference signs.

DETAILED DESCRIPTION

Figure 1:
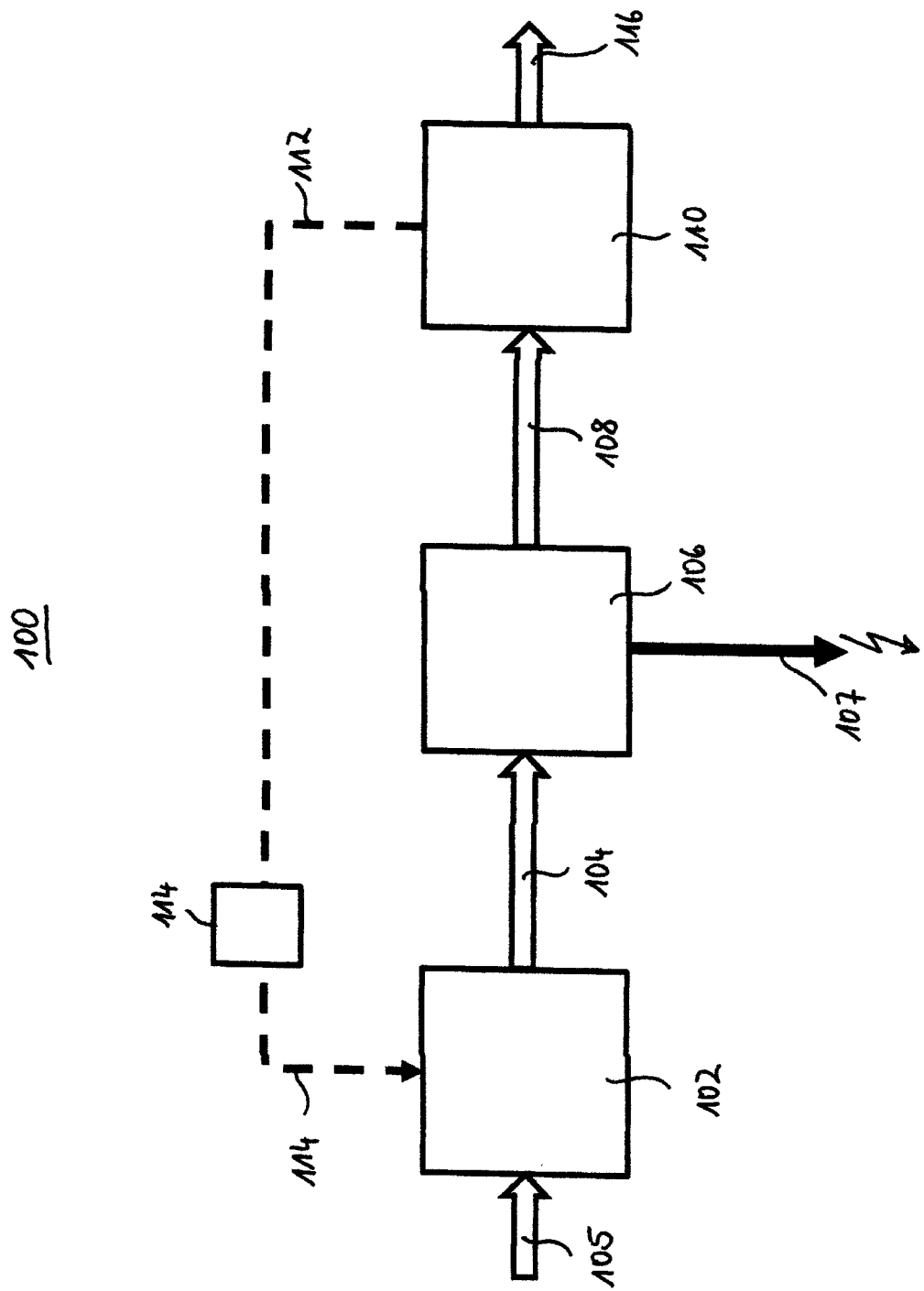
FIG. 1: a schematic illustration of the APU system.

FIG. 1 shows a schematic illustration of an auxiliary power unit, APU, system 100 based on fuel technology for providing electric power. The APU system 100 comprises a fuel reformer 102 which is adapted to produce a hydrogen rich gas 104 from a hydrocarbon fuel 105. The hydrogen rich gas 104 is introduced into a fuel cell stack 106 arranged downstream of the fuel reformer 102. In the fuel cell stack electric energy 107 is produced by guiding hydrogen to an anode side of a proton electron membrane and an oxidant to a cathode side. Excess hydrogen 108, which is not used in the fuel cell stack may then be transferred to a catalytic burner assembly 110, where the excess hydrogen 108 is reacted with air to produce heat 112. The heat 112 is then used for producing steam 114 which in turn is used in the fuel reformer 102 for the conversion of hydrocarbon fuel 105 to hydrogen rich gas 108. Byproducts from the fuel reforming process and the catalytic burning, such as carbon dioxide and nitrogen oxides, may leave the catalytic burner 110 as exhaust 116.

Figure 4:
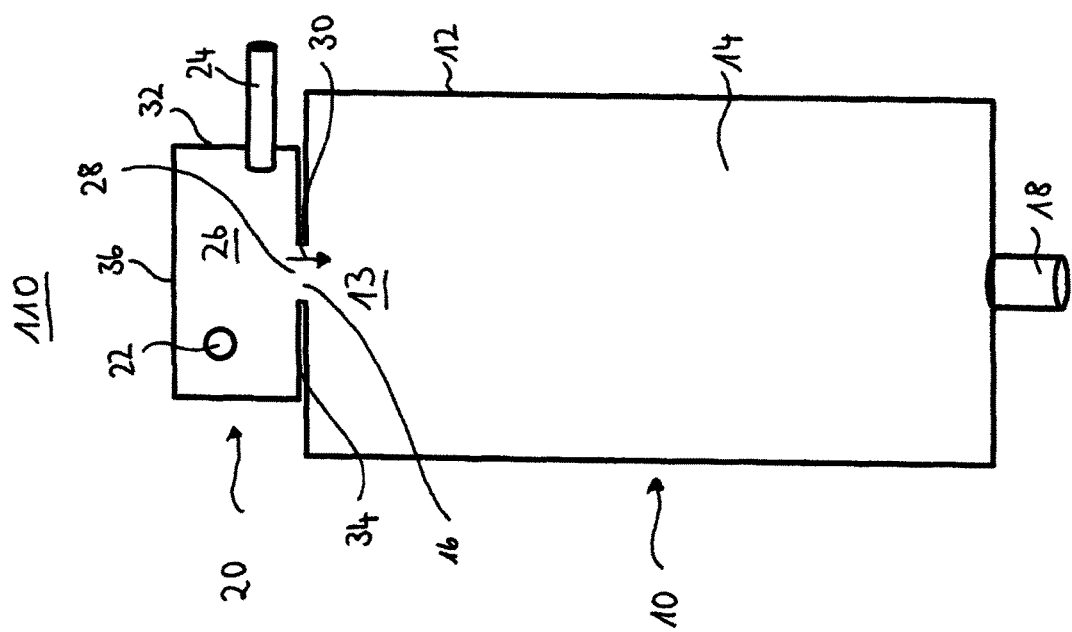
FIG. 4: a schematic view of a second preferred embodiment of the catalytic burner.

FIG. 2 and FIG. 4 show schematic illustrations of two alternative embodiments of the catalytic burner assembly 110. As can be seen from FIGS. 2 and 4, the burner assembly 110 comprises at least two units, namely a burner unit 10 and a mixing unit 20. The burner unit 10 comprises a housing 12 defining a reaction chamber 13 in which a catalyst 14 is incorporated. Further the housing 12 comprises a fluid inlet 16 and a fluid outlet 18. The mixing unit 20 is arranged in close vicinity to the burning unit 10 and adapted to provide a homogenous mixture of air and hydrogen, which is fed through the fluid inlet 16 into the housing 12 and to the catalyst 14. The mixing unit 20 itself comprises a fuel inlet 22 and an oxidant inlet 24, wherein fuel and oxidant are mixed in a mixing chamber 26 and may exit the mixing unit 20 through a fuel-oxidant mixture outlet 28. FIGS. 2 and 4 further depict that the fuel inlet 22 and the oxidant inlet 24 are angled to a fluid flow direction 30 from the mixing unit 20 to the burner unit 10.

Further, the mixing unit 20 may be cylindrically shaped having a mantel side 32 and two base plates 34 and 36. Instead of the cylindrically shape also any other prismatic shape is possible, wherein two base plates 34 and 36 are connected by at least three side surfaces 32.

As can be seen from the first embodiment depicted in FIG. 2, the fuel-oxidant-outlet 28 is a pipe-shaped hollow element and its length L extends at least over one of the inlets 22; 24 in the mixing chamber 26. By extending the pipe-shaped fuel-oxidant outlet 28 over at least one of the inlets 22; 24, the risk of oxidant entering the fuel inlet, which may cause uncontrolled combustions, is significantly reduced. Additionally, the fuel inlet may be arranged upstream of the oxidant inlet 24, whereby the risk of uncontrolled combustions is further reduced. The pipe-shaped fuel-oxidant outlet 28 further comprises a first opening 28-1 arranged in the mixing chamber 26 and a second opening 28-2 which is provided in a bottom plate 34 of the mixing unit 20. Thereby it should be noted that more than one opening may be provided as first and/or second opening 28-1, 28-2.

As illustrated in the second embodiment shown in FIG. 4, the fuel inlet 22 is arranged upstream of the oxidant inlet 24, whereby an entering of the oxidant into the fuel inlet 22 is avoided. Thereby an unwanted ignition of oxidant and fuel inside the fuel inlet 22 is avoided. In contrast to the illustrated embodiment of FIG. 2, the fuel-oxidant outlet 28 is not pipe-shaped but designed as simple opening in the bottom plate 34.

In both depicted embodiments, the fuel-oxidant mixture outlet 28 merges with the fluid inlet 16 of the burner unit 10. Of course it is also possible that the pipe-shaped fuel-oxidant outlet 28 is elongated, or that a connection pipe is arranged between the burner unit 10 and the mixing unit 20, which fluidly connects the fuel-oxidant-mixture outlet 28 and the fluid inlet 16.

Figure 5:
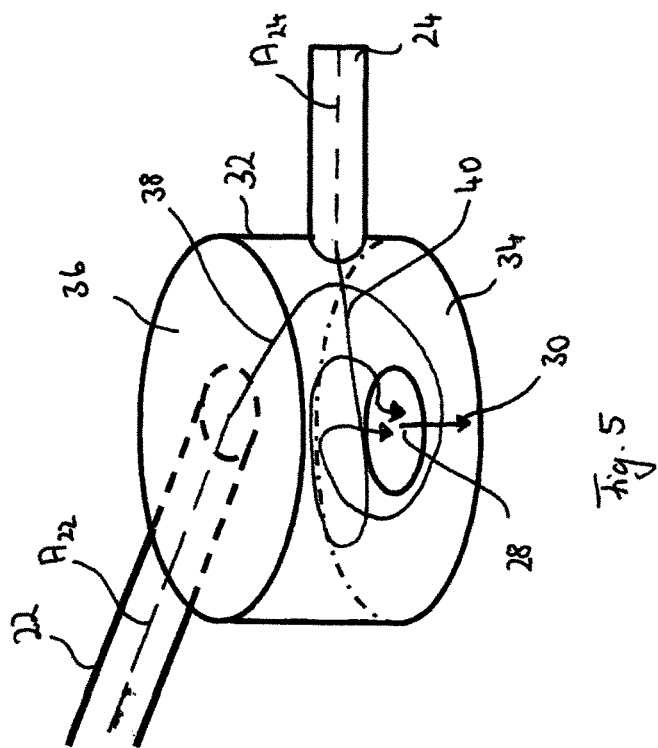
FIG. 5: a schematic detailed spatial view of the mixing unit shown in FIG. 4.

FIG. 3 and FIG. 5 show detailed spatial views of the mixing unit 20 as shown in FIG. 2 and FIG. 4, respectively. As illustrated in FIG. 3 and FIG. 5, the fuel inlet 22 and the oxidant inlet 24 are arranged at the mantel side 32, wherein the fuel oxidant mixture outlet 28 is arranged at/in the bottom base plate 34. The fuel inlet 22 and the oxidant inlet 24 are pipe-shaped providing longitudinal axes A22, A24, whereby a directed fuel stream 38 respectively oxidant stream 40 are provided. These directed streams 38 and 40 are deviated by the walls 32 of the mixing unit 20 into a circular motion 41, whereby turbulences are introduced in the reaction chamber 26. Thereby a mixing of fuel and oxidant is performed. Besides that the mixed gas stream has to undergo a stream redirection from the circular motion the linear motion through the outlet 28, whereby further perturbations may be caused in the fluid streams and the homogeneity of the mixing may even be further improved. As can be further seen from FIG. 3, the pipe-shaped fuel-oxidant outlet 28 intensifies the induced swirling motion and the redirection of the fluid streams, whereby the mixing is enhanced.

It should be further noted that in case a pipe-shaped fuel-oxidant outlet 28 is used, the fuel inlet 22 and the oxidant inlet 24 may be on the same level. Even if an arrangement at the same level is in principle also possible without a pipe-shaped fuel-oxidant-outlet 28, the risk of oxidant entering the fuel pipe 22 increases. In this case, it is therefore preferred to arrange the fuel inlet 22 upstream of the oxidant inlet 24 in order to hinder the oxidant from entering the fuel inlet 22.

For providing an optimal mixing the fuel inlet 22 and the oxidant inlet 24 are arranged in such a way that the respective fluid streams enter the mixing chamber tangentially as depicted in the top view of FIG. 6. By the tangential interjection the swirling motion in the chamber 26 and thereby the homogeneity of the mixing may be maximized.

FIGS. 7a and 7b show a further optional detail of the mixing device 20. As can be seen from the illustrated side views, the axes A22, A24 of the fuel inlet pipe 22 respectively the oxidant inlet pipe 24 may be inclined by a predetermined angle $\alpha$; $\beta$ in relation to a cross sectional plane 42 of the mixing unit 20. Usually these angles $\alpha$; $\beta$ is relatively small, preferably below 10° for ensuring that the fluid streams have a sufficiently long stay time in the mixing chamber 26 for developing the desired homogenous mixture. On the other hand the inclination further ensures that air streaming through the oxidant 24 does not enter the fuel pipe 22. Thereby the angles $\alpha$; $\beta$ may provide the same or a different inclination.

In general the inventive mixing unit hinders ignition of hydrogen in the pipes. Additionally, the mixing unit also reduces emissions of unwanted byproducts produced during the catalytic burning process since all combustible gases are burned due to the homogenous mixing. Additionally, only little excess air is necessary for reaching complete combustion, and increasing the temperature to the desired temperature suitable for methane combustion performed in the catalyst, which in turn reduces the amount of unwanted byproducts. Consequently, the catalytic burner efficiency may be maximized as the reactor temperature and hence the methane conversion is quickly in the desired range.

REFERENCE SIGNS 100 auxiliary power unit
102 fuel reformer
104 hydrogen rich gas
105 hydrocarbon fuel
106 fuel cell stack
107 electricity
108 hydrogen
110 catalytic burner
112 heat
114 steam production
10 catalytic burner unit
12 housing
14 catalyst
16 fluid inlet
18 fluid outlet
20 mixing unit
22 fuel inlet
24 oxidant inlet
26 mixing chamber
28 fuel-oxidant mixture outlet 28-1; 28-2 openings
30 fluid stream direction from the mixing chamber to the reaction chamber
32 mantel side
34 bottom base plate
36 top base plate
38 fuel stream direction
40 oxidant stream direction
42 cross sectional plane
L length of fuel-oxidant outlet
A22 longitudinal axis of fuel inlet
A24 longitudinal axis of oxidant inlet

The invention claimed is:

1. Catalytic burner arrangement comprising
a catalytic burner unit with a housing having a reaction chamber in which a catalyst is arranged, wherein the catalyst is adapted to react a fuel with an oxidant for producing heat, the housing having a fluid inlet for supplying a fluid stream into the housing and a fluid outlet for exiting a fluid stream from the housing,
a mixing unit forming a mixing chamber in which fuel and oxidant are mixed, wherein the mixing unit comprises a fuel inlet, an oxidant inlet and a fuel-oxidant-mixture outlet, and
wherein the fluid inlet merges with the fuel-oxidant-mixture outlet of the mixing unit in a main fluid flow direction for transferring the fuel-oxidant-mixture from the mixing chamber to the reaction chamber of the catalytic burner unit,
wherein the fuel inlet is arranged upstream of the oxidant inlet with regard to the main fluid flow direction, the main fluid flow direction extends in a straight line from the fluid inlet to the reaction chamber, and the fuel-oxidant-mixture outlet is an opening in a basis plate of the mixing unit, and
wherein the fuel inlet and the oxidant inlet are arranged angled to a direction of a main fluid stream streaming through the fuel-oxidant-mixture outlet to the reaction chamber.

2. Catalytic burner arrangement according to claim 1, wherein the mixing chamber has two basis plates which are connected by at least one side face, wherein the fuel-oxidant-mixture outlet is arranged at one of the basis plates and the oxidant inlet is arranged at the side face.

3. Catalytic burner arrangement according to claim 2, wherein a length of the pipe-shaped fuel-oxidant-mixture outlet extends over at least the oxidant inlet.

4. Catalytic burner arrangement according to claim 1, wherein the fuel inlet and/or the oxidant inlet is designed as at least one pipe having a longitudinal axis, whereby a directed fluid stream of fuel and/or oxidant is introduced into the mixing chamber.

5. Catalytic burner arrangement according to claim 4, wherein the mixing chamber is prismatically or cylindrically shaped, having two basis plates and at least three side surfaces sides or a mantel side, wherein the fuel inlet and the oxidant inlet are arranged at the side surfaces or the mantel side, and the fuel-oxidant-mixture outlet is arranged at one of the basis plates, and wherein the directed fluid streams are offset from a longitudinal axis of the mixing chamber, thereby providing at least one tangential fluid stream.

6. Catalytic burner arrangement according to claim 4, wherein the longitudinal axis of the fuel inlet and/or the oxidant inlet is inclined to a cross sectional plane of the mixing chamber.

7. Catalytic burner arrangement according to claim 1, wherein the mixing chamber is prismatically or cylindrically shaped, having two basis plates and at least three side surfaces sides or a mantel side, wherein the fuel inlet and the oxidant inlet are arranged at the side surfaces or the mantel side, wherein the fuel-oxidant-mixture outlet is arranged at one of the basis plates.

8. Catalytic burner arrangement according to claim 1, wherein the oxidant inlet and the fuel inlet are arranged substantially rectangular to each other.

9. Catalytic burner arrangement according to claim 1, wherein the fuel is a hydrogen containing fuel and the oxidant is air.

10. Auxiliary power assembly based on fuel cell technology comprising at least
  a fuel processing assembly which is adapted to convert hydrocarbon fuels into a hydrogen rich gas for fuel cells by using at least hydrocarbon fuel and steam;
  downstream of the fuel processor assembly, at least one fuel cell or fuel cell stack for providing auxiliary power; and
  downstream of the at least one fuel cell or fuel cell stack, a catalytic burner unit which is adapted to burn unused hydrogen exiting from the at least one fuel cell or fuel cell stack by using an oxidant and a catalyst for reacting oxidant and hydrogen to heat, wherein the heat is used to produce steam used in the fuel processing assembly,
  wherein a catalytic burner arrangement according to claim 1 is used.

* * * * *